United States Patent [19]
Musschoot

[11] Patent Number: 4,617,832
[45] Date of Patent: Oct. 21, 1986

[54] VIBRATORY APPARATUS HAVING VARIABLE LEAD ANGLE AND FORCE

[75] Inventor: Albert Musschoot, Barrington, Ill.

[73] Assignee: General Kinematics, Barrington, Ill.

[21] Appl. No.: 588,305

[22] Filed: Mar. 12, 1984

Related U.S. Application Data

[63] Continuation-in-part of Ser. No. 420,602, Sep. 20, 1982, Pat. No. 4,495,826, which is a continuation-in-part of Ser. No. 250,112, Apr. 2, 1981, abandoned.

[51] Int. Cl.[4] .............................................. F16H 33/10
[52] U.S. Cl. .......................................... 74/87; 74/61; 198/770; 51/163.2; 241/175
[58] Field of Search ............... 198/757, 766, 768, 770, 198/771; 74/61, 87, 571 L; 51/163.1, 163.2; 241/153, 175, 284, 292

[56] References Cited

U.S. PATENT DOCUMENTS 3,358,815 12/1967 Musschoot et al. ................ 198/770
4,042,181 8/1977 Huber et al. ....................... 51/163.1
4,461,122 7/1984 Balz ........................................ 74/87
4,495,826 1/1985 Musschoot .......................... 198/770

FOREIGN PATENT DOCUMENTS 769547 3/1957 United Kingdom .................... 74/61

*Primary Examiner*—Joseph E. Valenza
*Attorney, Agent, or Firm*—Wood, Dalton, Phillips Mason & Rowe

[57] ABSTRACT

A vibratory apparatus is provided with an improved structure for varying the lead angle and the amount of the vibratory force by angularly and radially positioning a movable weight relative to a fixed eccentric weight. The apparatus comprises a plate supporting the fixed eccentric weight on the shaft in one of several positions with a line through the center of gravity of the fixed weight and the axis of the shaft forming a base line. The movable weight is carried by a cylinder attached to the plate so that the longitudinal axis of the cylinder passes through the axis of the shaft at an angle to the base line. The movable weight in the cylinder is movable from a position on one side of the axis of rotation to a second position on the opposite side of the axis of rotation, the movement being linear and radially across the axis of rotation. The resultant of the forces generated by the fixed weight and by the movable weight upon rotation of the apparatus will determine the lead angle and the amount of the vibratory force.

5 Claims, 20 Drawing Figures

Fig. 14.
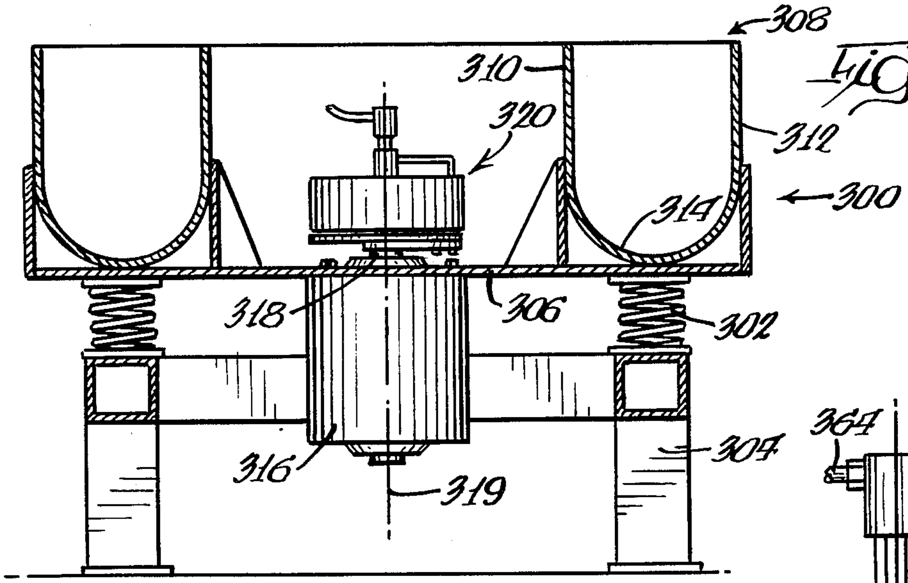
Fig. 15.
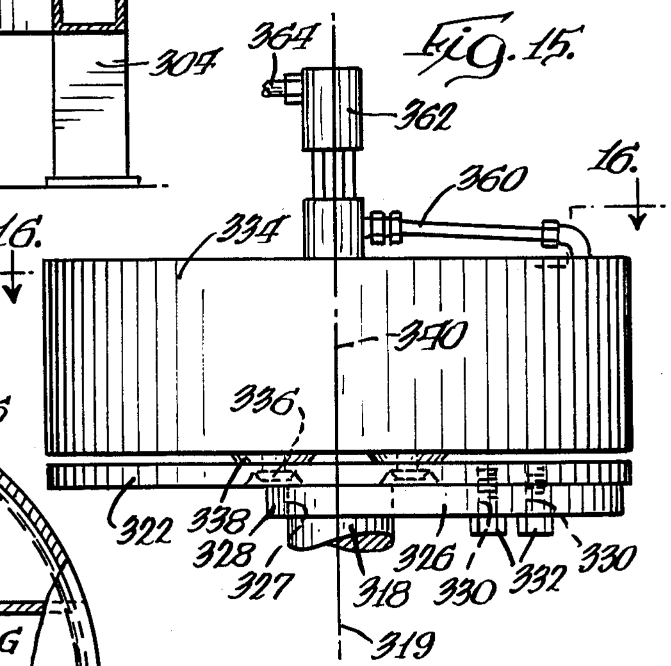
Fig. 16.
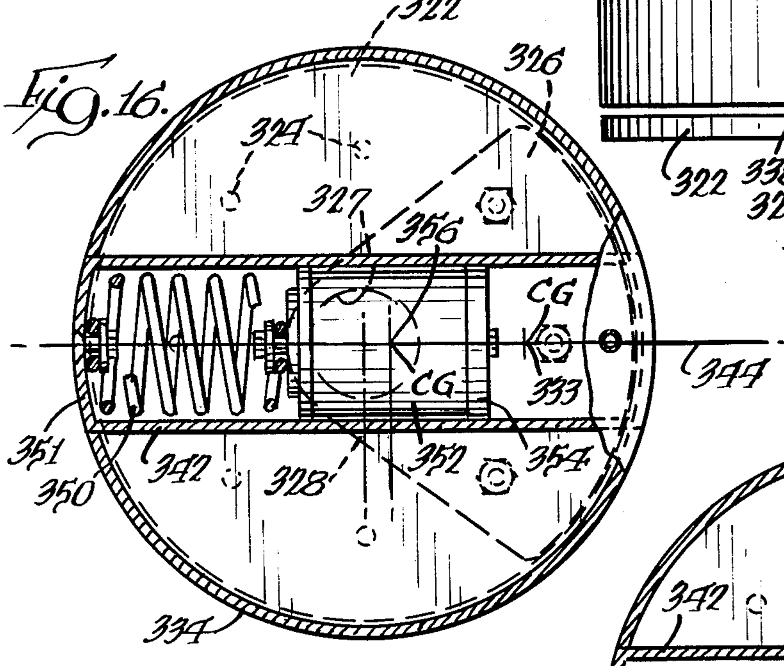
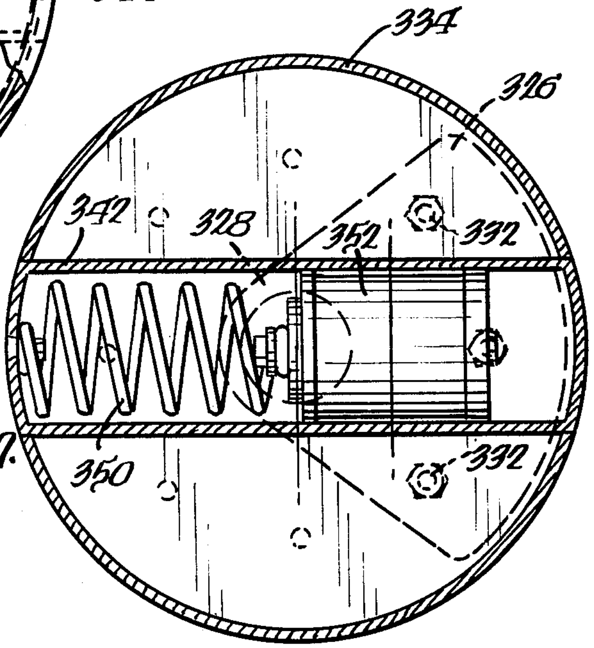
Fig. 17.

VIBRATORY APPARATUS HAVING VARIABLE LEAD ANGLE AND FORCE

CROSS-REFERENCE

This application is a continuation-in-part of my copending application Ser. No. 420,602, filed Sept. 20, 1982, now issued as U.S. Pat. No. 4,495,826, which is a continuation-in-part of my copending application Ser. No. 250,112, filed Apr. 2, 1981, now abandoned, entitled "Vibratory Apparatus" and assigned to the same assignee as the instant application.

BACKGROUND OF THE INVENTION

Vibratory feeding, conveying or milling apparatus has been used in industry for many years. A basic type of vibratory feeder is shown in the Musschoot et al U.S. Pat. No. 3,089,582 wherein a two-mass exciter system is employed to impart vibratory feeding or conveying movement to a material-carrying member or trough. In the vibration generating apparatus shown in that patent, a constant speed motor carries a pair of eccentric weights, one on each end of the motor shaft, and the vibrational force generated with operation of the motor is transmitted through a spring system to the material carrying trough. In the apparatus shown in said patent, the amplitude of vibration is constant, hence a constant nonvariable feed is provided.

An improved variable rate vibratory feeder or conveyor is shown in Musschoot et al U.S. Pat. No. 3,358,815 wherein the electric motor carries at each end of its shaft a wheel-like member rotated with the shaft, with the wheel-like member being provided with a weight shiftable in an arcuate path from a first position near a fixed eccentric weight on each wheel to a second position opposite the fixed weight. The preferred system shown in the last-mentioned patent is one where the weight is a fluid, namely mercury, and thus readily susceptible to movement by varying the pressure. In some situations, mercury is considered as a pollutant and hence the mercury type of variable rate feeder has not been universally accepted.

In bowl-type milling apparatus, the vibratory movement is provided with a lead angle which will roll the material as it is being milled to a desired finish. One such device is shown in the U.S. Pat. No. 4,042,181 to Huber et al entitled "Lead Angle Controlling Mechanism" wherein one eccentric weight is fixed and a second eccentric weight is adjustable relative to the fixed eccentric weight so that in operation the resultant force has a particular lead angle that acts to roll the material being milled. A specific lead angle is employed for each product to maximize the roll for proper finishing. The apparatus required stops and bumpers and springs and worm gear devices to set the positions of the second eccentric weight relative to the first eccentric weight.

SUMMARY OF THE INVENTION

According to one form of the present invention, a system is provided somewhat similar to that shown in my previous U.S. Pat. No. 3,358,815, but differing therefrom in that a metal weight may be used and the movement of the weight is not in a curved path around the axis of rotation, but rather in a linear path extending radially of the axis of rotation. Furthermore, the system may be utilized wherein a spring is employed to move the movable weight from a first position on the same side of the axis of rotation of the wheel-like member as a fixed eccentric weight, to a position on the opposite side of the axis of rotation, with the spring operating initially in compression to move the movable weight beyond said axis and the spring thereafter operating in tension, resisting but not preventing movement of the movable weight outwardly in response to centrifugal force. The movable weight includes a piston which is controlled by fluid pressure and because of the spring action just described, the ratio between fluid pressure and the movement of the movable weight is linear, thus greatly facilitating and simplifying the control.

As an alternative structure, in the stationary position the spring holds the movable weight in a first position on the same side of the axis of rotation as the fixed eccentric weight. Rotating the wheel-like member will load the spring in tension as the movable weight responds to centrifugal force. The spring resists but does not prevent outward movement of the movable weight until a maximum outward position of the movable weight is reached which combines with the fixed weight to produce a maximum unbalance and therefore a maximum vibratory motion. The maximum outward position is reached when the centrifugal force of the weight is equal to the tension force (or returning force) of the spring. Admitting fluid under pressure to the piston outboard of the spring will move the movable weight against the centrifugal force and, aided by the spring, in a radial inward direction until the center of gravity of the movable weight reaches the original stationary position. Thereafter, movement of the piston and movable weight will compress the spring until the center of gravity of the movable weight passes the axis of rotation of the shaft whereupon further movement of the piston and movable weight will move the center of gravity beyond the axis of rotation of the shaft whereupon further movement of the piston and movable weight will move the center of gravity beyond the axis of rotation so that centrifugal force will move the movable weight outward. The compressive forces of the spring will resist but will not prevent the outward movement of the movable weight. At the outermost position of the movable weight, the forces of the movable weight will balance the forces of the fixed weight so that the wheel-like member is in balance and there will be no vibratory forces created by the member. The ratio between the fluid pressure and the movement of the movable weight is linear making control simpler and predictable.

An assembly is provided where by rotating the wheel and movable weight 180° relative to the fixed weight converts the apparatus from a 0 pressure 0 vibratory force system to a 0 pressure maximum vibratory force system.

Using the assembly in a milling apparatus overcomes the complexities of the prior art and provides a highly versatile mechanism for use with a milling bowl to produce a proper finish on parts in a short time frame. The apparatus has a vertical shaft with a fixed plate to which a fixed eccentric weight is attached in one of many selected positions so that a line through the center of gravity of the fixed weight and the axis of rotation is a base line. A cylinder is affixed on the plate with its longitudinal axis passing through the axis of rotation of the plate and defning an angle with the base line. A movable weight is movable with a piston in the cylinder whereby fluid pressure on the piston will position the movable weight relative to the fixed weight so that rotation of the plate will produce a lead angle coincident with the resultant of the forces from the fixed weight and movable weight. The apparatus is very flexible providing minimum adjustment to arrive at a wide variety of lead angles and vibratory forces to produce the desirable finish on the parts.

BRIEF DESCRIPTION OF THE DRAWINGS

FIG. 14 is a partial cross-sectional elevation of a mill taken in vertical section along a center line thereof and broadly embodying the invention therein;

FIG. 15 is an enlarged view of the vibratory apparatus forming the principal part of the invention;

FIG. 16 is a cross-sectional view taken along the lines 16—16 of FIG. 15;

FIG. 17 is a view similar to FIG. 16 only with the weight moved outboard of the axis of the shaft;

DESCRIPTION OF THE PREFERRED EMBODIMENT

Figure 1:
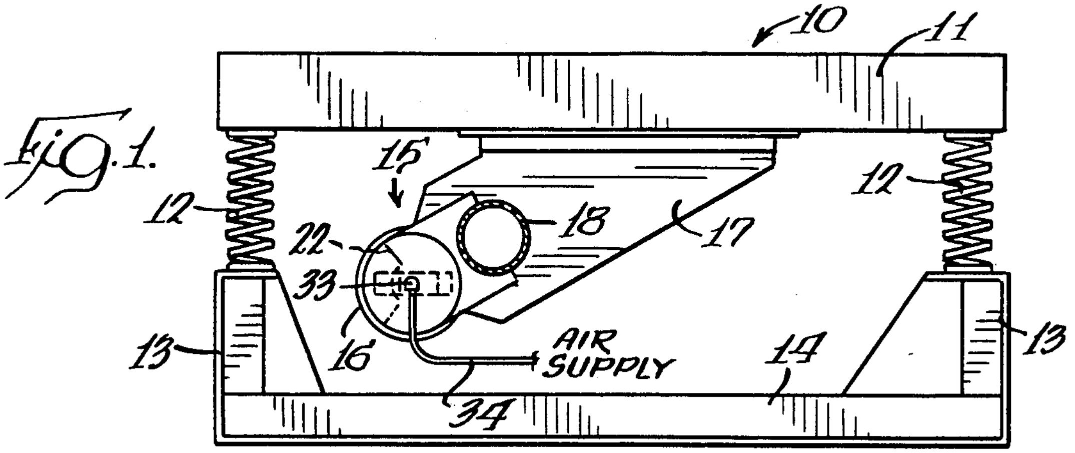
FIG. 1 is a side elevational view of a vibratory feeder embodying the invention.

Referring to the drawings, in FIG. 1 there is shown a vibratory feeder 10 similar to that shown in U.S. Pat. No. 3,358,815, and includes a material-carrying member in the form of a trough 11 mounted on isolation springs 12 supported on legs 13 upstanding from a base 14. The vibration generating apparatus includes an exciter member generally designated as 15 having a constant speed electric motor 16. The electric motor is connected to frame member 17 secured to the trough 11 through the medium of rubber shear springs such as shown in my previous U.S. Pat. Nos. 3,089,582 and 3,358,815. The rubber shear springs are diagrammatically shown at 18. Thus, the motor 16 is connected to the frame member 17 through a spring system and the motor operates at a constant speed near the natural frequency of such spring system.

Figure 2:
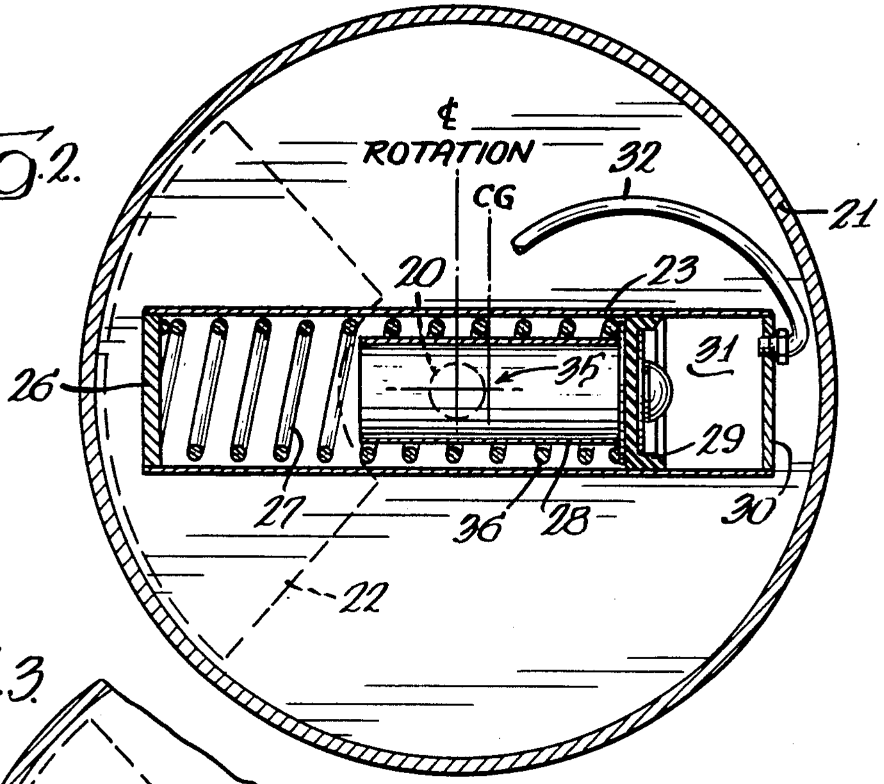
FIG. 2 is an enlarged cross-sectional view of one of the two wheel-like members affixed to the motor shaft.

The motor 16 has a motor shaft 20 indicated by dotted lines in FIG. 2 and the shaft carries at each end duplicate wheel-like members 21, one of which is shown and the other of which is identical in construction. Fixed on each wheel on one side of the axis of rotation of the shaft 20 is a fixed weight 22. Also mounted on each wheel is a cylinder 23 which extends radially on either side of the shaft 20. The cylinder has one end 24 near the center of gravity of the weight 22 and opposite end 25 on the other side of the axis of rotation of the shaft. A cap 26 closes the end 24 of the cylinder and secured thereto is a coil spring 27. Within the cylinder 23 is a weight 28 secured to a piston 29 slidable in the cylinder. The piston and weight together form a movable weight within the cylinder 23.

A cap 30 closes the end 25 of the cylinder to form therein a pressure chamber 31 between the piston 29 and the cap 30. A fluid pressure line 32 connects at one end to the pressure chamber 31 and at its other end to a rotatable connector 33 mounted on the shaft 20 as shown in FIG. 1. A fluid pressure line 34 connects at one end to the connector 33 and at its other end to a source of fluid under pressure, for example, compressed air.

Figure 3:
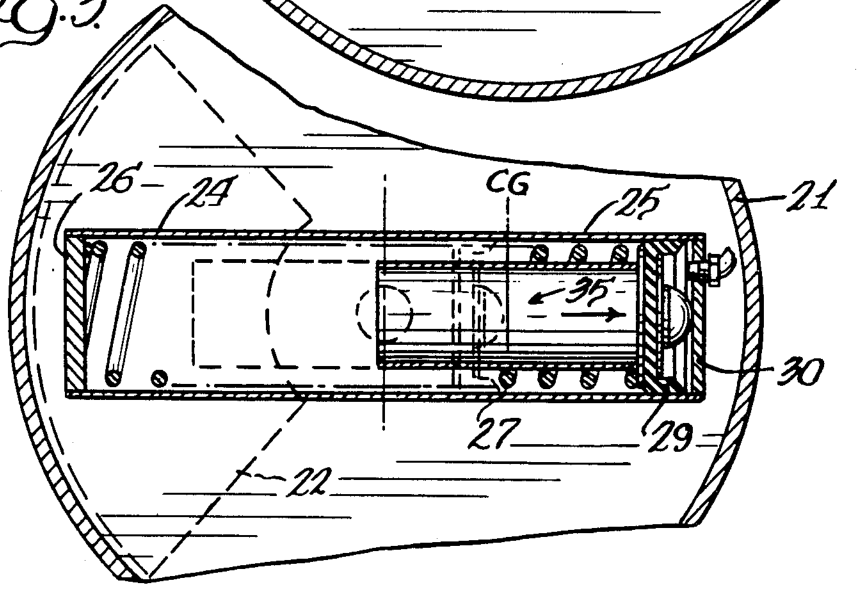
FIG. 3 is a view of a portion of FIG. 2 showing the movable weight in a changed position.

When at rest, the center of gravity (indicated at 35) of the piston and weight system plus that portion of the spring 36 located to the right of the axis of rotation of the shaft as seen in FIG. 2 is in the position indicated. After startup and as the motor reaches operating speed, the piston and weight move outwardly from the axis of rotation to the position shown in FIG. 3. The rotation extends the spring 27 in tension opposing the centrifugal force on the piston and weight. In the position of the parts as shown in FIG. 3, the vibratory force generated by the fixed weight 22 and the spring portion to the left of the axis of rotation (as shown in FIG. 3) is equal and opposite to the vibratory force generated by the weight, piston, and spring portion 36 to the right of the axis of rotation, with the result that no vibratory force is imparted by the exciter member to the trough 11. Applying fluid pressure through the lines 34, connector 33, and line 32, and into the pressure chamber 31, will cause the piston and weight to move to the left (as shown in FIG. 3) with the tension of the spring initially assisting the force exerted by the fluid pressure but with the spring assistance diminishing as the piston and weight move toward the axis of rotation (thus reducing the centrifugal force exerted by those members) and finally as the piston and cylinder are moved further to the left beyond the position shown in FIG. 2, the coil spring resists further movement of the piston and weight which are then being moved to the left by a combination of fluid pressure and centrifugal force.

Thus it can be seen that when the centrifugal force generated by the movable weight and piston is at its greatest, as shown in FIG. 3, and is sufficient to move the weight and spring to the position shown in that figure against the tension of the spring, the spring tension assists the fluid pressure in moving the spring and weight to the left, with such assistance by the spring diminishing to zero as the piston and weight reach the position of FIG. 2, and then operating in compression and in opposition to the fluid pressure when the piston and weight move farther to the left from the position shown in FIG. 2, which movement of the piston and cylinder creates a centrifugal force tending to move them outwardly toward the fixed weight 22.

Figure 4:
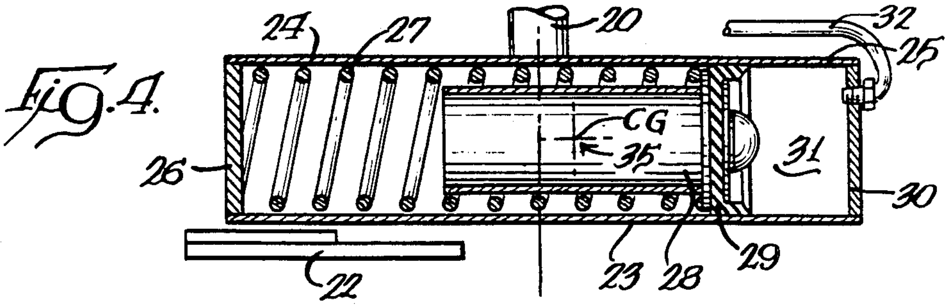
FIG. 4 is a sectional view taken generally along the longitudinal axis of the assembly as shown in FIG. 2.

FIG. 4 is a sectional view of the wheel-like member 21 showing the fixed weight 22 attached to the member 21 and showing the center of gravity 35 of the movable weight 28 in the stationary position (prior to starting rotation of the motor and wheel-like member 21).

The modified form of the invention shown in FIGS. 5–8, inclusive, has a motor shaft 120 which carries duplicate wheel-like members 121, one of which is shown. Fixed on each wheel on one side of the axis of rotation of the shaft 121 is the fixed weight 122. A cylinder or carrier 123 which extends radially on either side of the shaft 120 has a longitudinal axis that lies in a plane that passes through the center of gravity of the fixed weight 122 and through the axis of rotation of the shaft 120. The cylinder or carrier 123 has one end portion 124 near the center of gravity of the fixed weight 122 and has an opposite end portion 125 on the diametrically opposite side of the axis of rotation of the shaft. A cap 126 closes the end 124 of the cylinder 123 with a bumper or stop member 140 extending through the midportion thereof into the inside of end portion 124.

Figure 5:
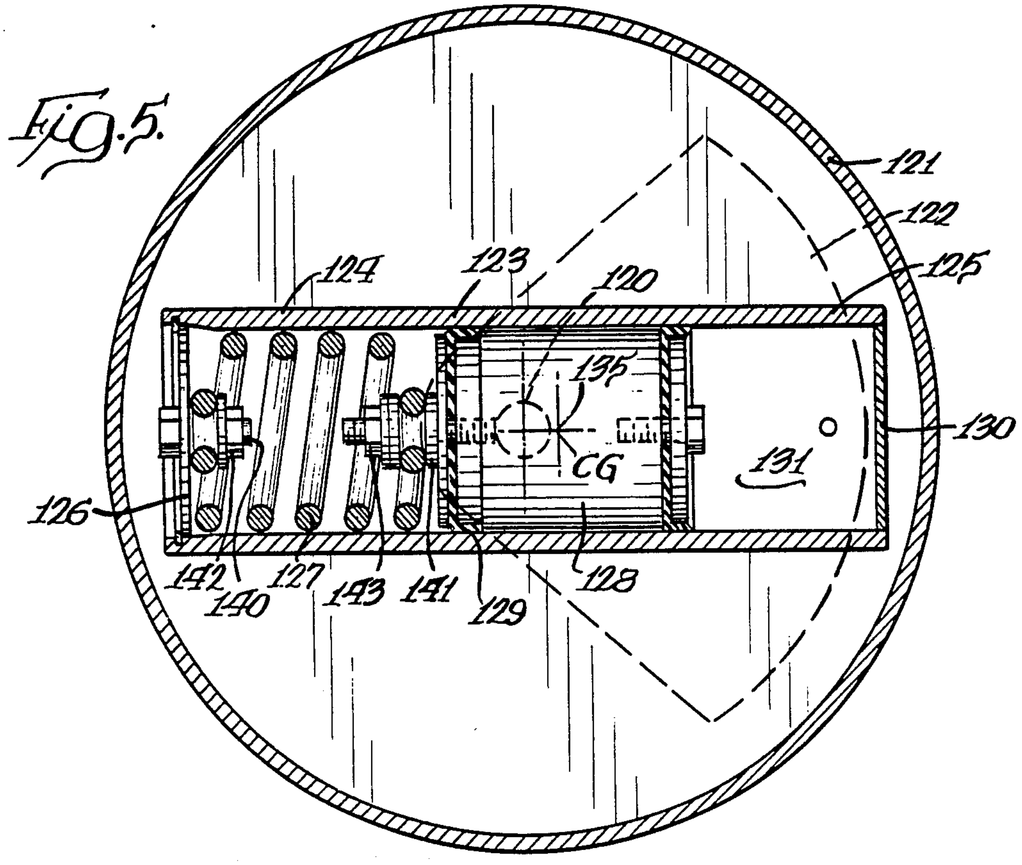
FIG. 5 is an enlarged cross-sectional view of a modified form of one of the two wheel-like members affixed to the motor shaft.
Figure 6:
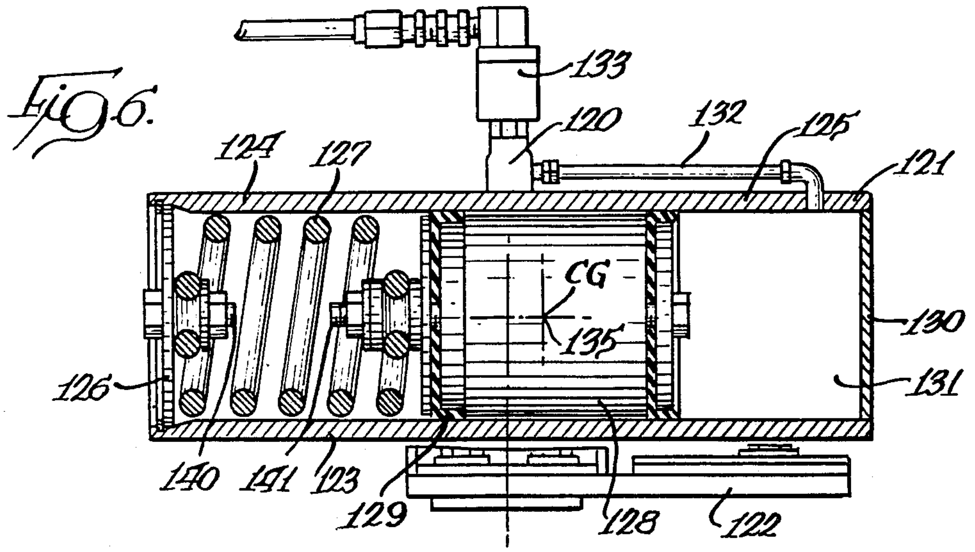
FIG. 6 is a sectional view taken generally along the horizontal axis of the assembly as shown in FIG. 5.

A coil spring 127 is secured to the end cap and is positioned in the end portion 124 of the cylinder. A weight 128 is secured to a piston 129 slidably mounted in the cylinder or carrier 123 with a second threaded stop member 141 extending from the midportion of the one end of the piston 129 toward the stop 140. The ends of the springs 127 are secured to the stop members 140,141 or to the end cap 126 and to one end of the piston 128. Adjusting nuts 142,143 are, respectively, threaded on the stop members 140,141 so as to adjust the positions of the stop members relative to each other. As shown in FIGS. 5 and 6, in the at rest or stationary position of the wheel-like member the center of gravity 135 of the weight 128 is offset to the right of the axis of rotation. Stated another way, the center of gravity 135 of the movable weight 128 is displaced outboard of the center of rotation of the wheel on the side of the center of rotation opposite to the spring 127, with the spring in its neutral uncompressed, untensioned condition. The center of gravity of the movable weight 128 is displaced outboard of the axis of rotation of the wheel so that centrifugal forces will act on the movable weight 128 upon rotation of the wheel.

A cap 130 closes the end 125 of the cylinder to form therein a pressure chamber 131 between one end of piston 129 and the cap 130. A fluid pressure line 132 connects at one end to the pressure chamber 131 and at its other end to a rotatable connector 133 mounted on the shaft 120. A fluid pressure line 134 connects at one end to the connector 133 and at its other end to a source of fluid under pressure. The fluid can be air, hydraulic or pneumatic.

Figure 7:
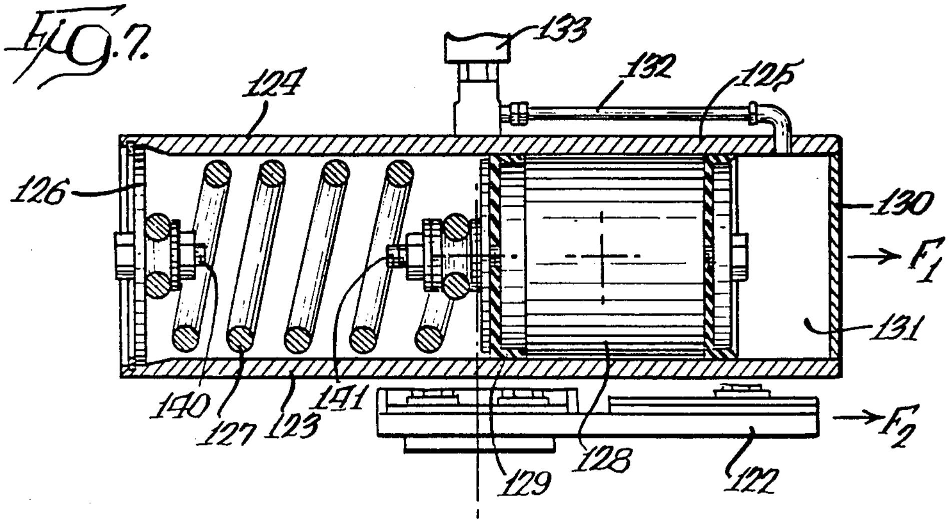
FIG. 7 is a view similar to FIG. 6 only showing the movable weight at one extreme position in the carrier.

At startup, with no pressure in the chamber 131, and as the motor reaches operating speed, the piston and weight 128 move radially outward from the axis of rotation to the position shown in FIG. 7. The rotation of the wheel extends the spring 127 in tension opposing the centrifugal force on the piston and weight until at the rated speed of rotation of the motor an equilibrium position is reached, i.e. the centrifugal force of the movable weight and piston equals the tension force of the spring. In the equilibrium position shown in FIG. 7 with the motor running at its rated speed, the centrifugal force ($F_2$) acting on the fixed weight 122 combines with the centrifugal force ($F_1$) of the movable weight 128 and piston 129 to generate the maximum vibratory force ($F_1+F_2=$Max.) for transmission by the exciter member to the trough.

Figure 8:
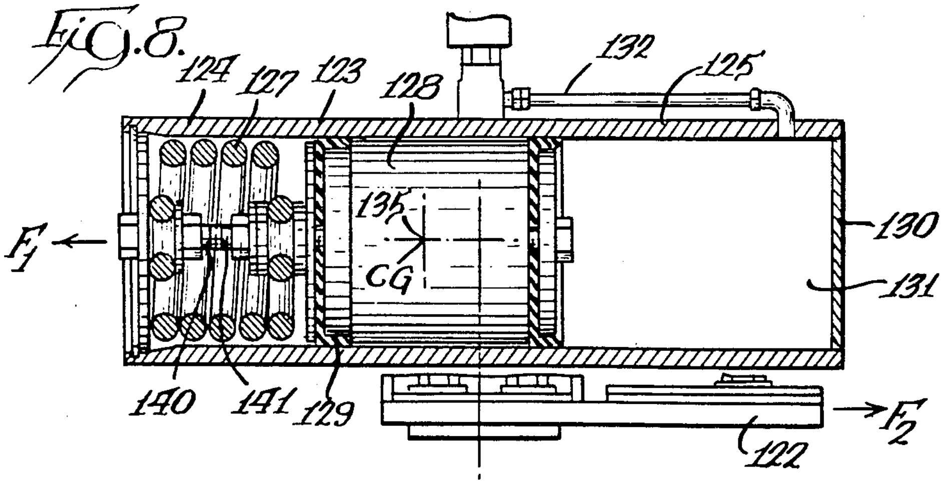
FIG. 8 is a view similar to FIG. 6 only showing the movable weight at the other extreme position of the carrier.

Applying pressure through the lines 134, connector 133 and line 132 into the pressure chamber 131 will move the piston 129 and weight 128 toward the left as shown in FIG. 8 with the tension of the spring 127 initially assisting the force exerted by the fluid pressure. The assistance afforded by the spring to the pressure in the chamber diminishes to 0 as the tension in the spring reaches 0. The centrifugal force exerted by the movable weight 128 and piston 129 is gradually reduced to 0 as the center of gravity of the movable weight and piston reaches the axis of rotation of shaft 120. Further increase in the pressure in the chamber 131 will move the movable weight 128 and piston 129 beyond the axis of rotation of the shaft whereby centrifugal forces will act on the movable weight which together with the pressure in the chamber will compress the spring 127. The compression of the spring 127 resists but does not neutralize the forces generated by the pressure in chamber 131 and the centrifugal forces acting on the weight 128 and piston 129. The forces ($F_1$) of the movable weight 128 and piston 129 continue to diminish the vibratory forces ($F_2$) created by the fixed weight 122 until the forces ($F_1$) counterbalances the forces ($F_2$) whereupon no vibratory forces are imparted by the exciter member to the trough 11.

With the motor running and the wheel rotating, the spring 27 in the FIGS. 2–4 version has one end portion which extends beyond the axis of rotation of the shaft and therefore contributes to the force balance in the system in that the centrifugal forces acting on that portion of the spring on the right side of the axis of rotation acts to partially balance the centrifugal forces acting on that portion of the spring to the left of the axis of rotation. As the spring lengthens or shortens, the effect on the system varies. In the FIGS. 5–8 version, the spring 127 is on the left side of the axis of rotation so its centrifugal effect is always in a direction to contribute to counterbalancing the centrifugal force of the fixed weight 122. In the fully extended condition of the spring of FIG. 7, the center of gravity of the spring is closer to the center of rotation so that the centrifugal force contributed to the system will be less than when the spring is compressed in the outboard position such as shown in FIG. 8.

Figure 9:
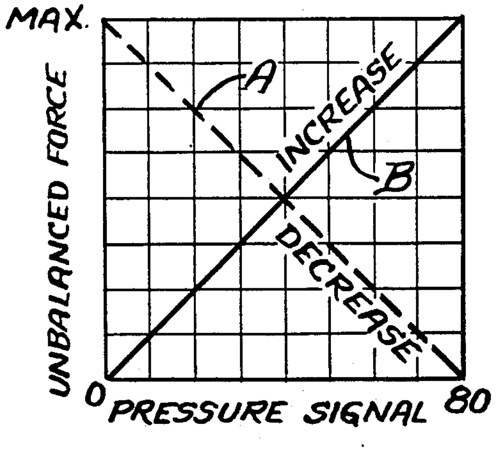
FIG. 9 is a chart showing the linear relationship between the pressure applied to move the movable weight and the unbalanced force.

Any static pressure can be used in the chamber 131 which pressure can be created by pneumatic fluid, hydraulic fluid or other liquid or gaseous fluids such as oil, air or the like. The apparatus has functioned unfailingly using fluid at a pressure of from 0 to 80 psi. The position of the movable weight is always established by the pressure balance which is a combination of centrifugal force and spring force. The chart of FIG. 9 plots the linear relationship between the applied pressure (applied to the piston in chamber 131) and the unbalanced force (as transmitted to the trough). The pressure applied in chamber 131 in pounds per square inch translates directly into the unbalanced force. Line A on the chart illustrates the linear function of the apparatus of FIGS. 5–8 wherein a 0 pressure in the chamber 131 with the motor running at rated speed will produce a maximum unbalanced force for the system. At 40 psi in the chamber 131 the unbalanced force will be about half and at 80 psi the unbalanced force will be 0; i.e. no vibratory forces will be transmitted to the trough. Line B illustrates the linear function of the apparatus of FIGS. 2–4 wherein when a pressure of 80 psi is applied in the chamber 131 with the motor running at rated speed, the maximum unbalanced force is generated and maximum vibratory forces are transmitted to the trough. At 40 psi the unbalanced force will be about half and at 0 psi the unbalanced force will be 0.

In the modified form of the invention shown in FIGS. 10–13, an apparatus is shown wherein the static position of the movable weight with respect to the fixed weight is reversible so that in one set up the FIGS. 2–4 relationship is locked in (0 psi pressure in the chamber produces 0 unbalanced forces) and in the other set up the FIGS. 5–8 relationship is locked in (0 psi pressure in the chamber produces maximum unbalanced forces).

The wheel 222 is shown in three parts 250,252, 254 with end parts 250 and 254 being mirror images of each other and being interchangeably bolted by bolts 256 to the center part 252. The center part 252 has an axial bore 258 aligned with blind humps 260 on the end parts 250,254. A cylindrically shaped sleeve 262 forming a cylinder or carrier 264 is fitted and secured in the axial bore 258 and extends on one end into the hump 260 on end part 250. A movable weight 228 is slidably disposed in the cylinder 264 and has a piston 266 attached thereto on the closed end 268 of the cylinder to define a pressure chamber 231 between the piston 266 and the end 268 of the cylinder 264.

A coil spring 227 is secured to the hump 260 of the end part 254 by bolt and nut 270 securing one pigtail end 271 of the spring to the end part 254. The other end of the spring 227 is secured to the movable weight 228 and piston 266 by a through bolt 272 and nut 274 passing through the pigtail 275 on the other end of the spring 227.

The wheel 222 is driven by the motor shaft 220 which carries a duplicate wheel 221 on the other end of said shaft. The wheel 221 is bolted by bolts 276 to a fixed weight 222 which weight in turn is affixed to the motor shaft. The fixed weight 222 has a center of gravity outboard (or below in FIG. 10) of the axis of rotation of the shaft. The carrier or cylinder 262 has a longitudinal axis that lies in a plane that passes through the center of gravity of the fixed weight 222 and through the axis of rotation of the shaft 220.

A fluid pressure line 232 connects at one end to the pressure chamber 231 and at its other end to a rotatable connector 233. A fluid pressure line connects the connector 233 to a source of fluid under pressure. The fluid can be air, hydraulic or pneumatic.

Figure 10:
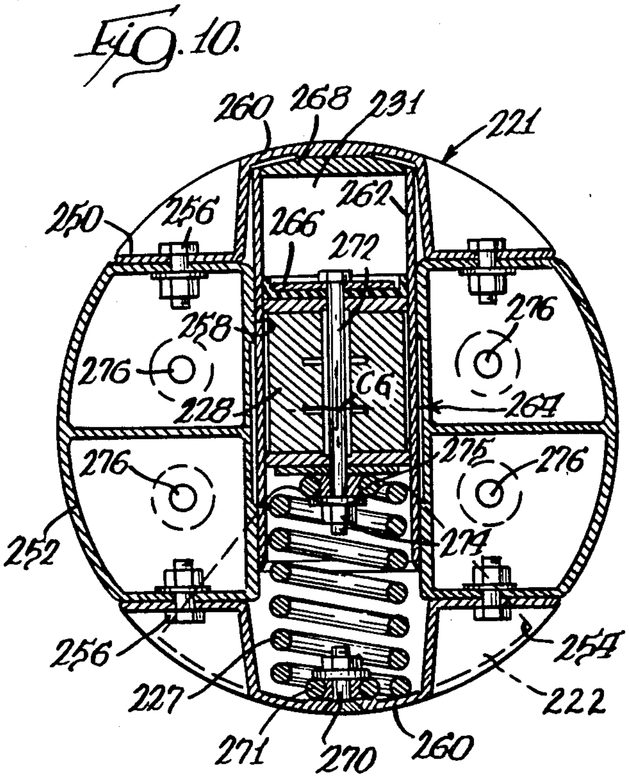
FIG. 10 is an elevational view partially broken away of another modified form of the invention.
Figure 11:
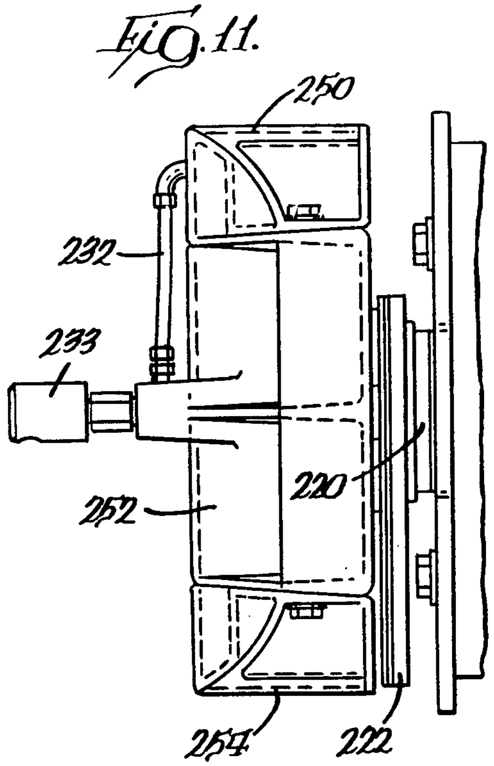
FIG. 11 is an end view of the structure of FIG. 10.

In the static state of FIGS. 10 and 11 the center of gravity of the fixed weight is below the rotational axis of the shaft and the spring 227 positions the center of gravity of the movable weight 228 on the opposite side of the rotational axis of the shaft. The operating principle of the assembly of FIGS. 10 and 11 are the same as for FIGS. 2–4 wherein at rated speed of rotation and 0 pounds of pressure in the chamber 231, the movable weight will be balanced by the tensioning spring force and by the fixed weight so that no vibratory forces are generated. At maximum pressure in the chamber the movable weight will move against the compression of the spring and produce maximum vibratory forces.

Figure 12:
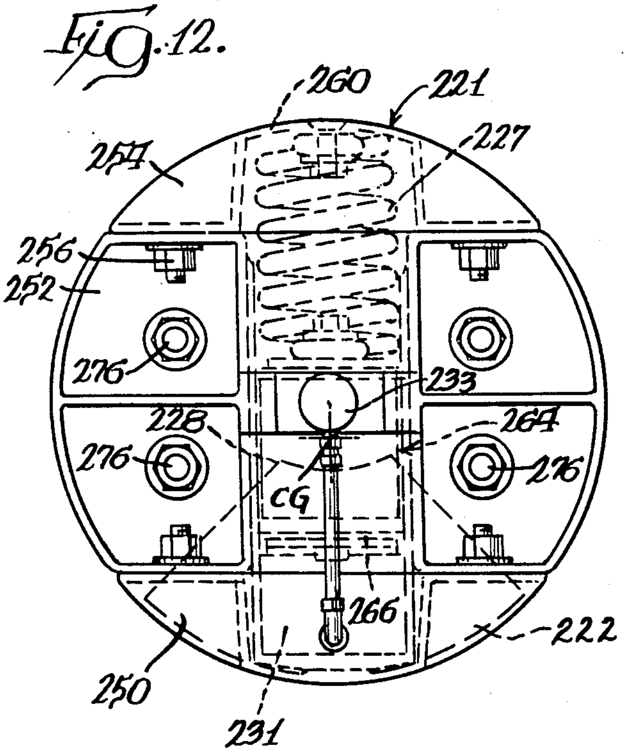
FIG. 12 is an elevational view of the modified form of the invention shown in FIG. 10 only adapted for a different vibratory force set up.
Figure 13:
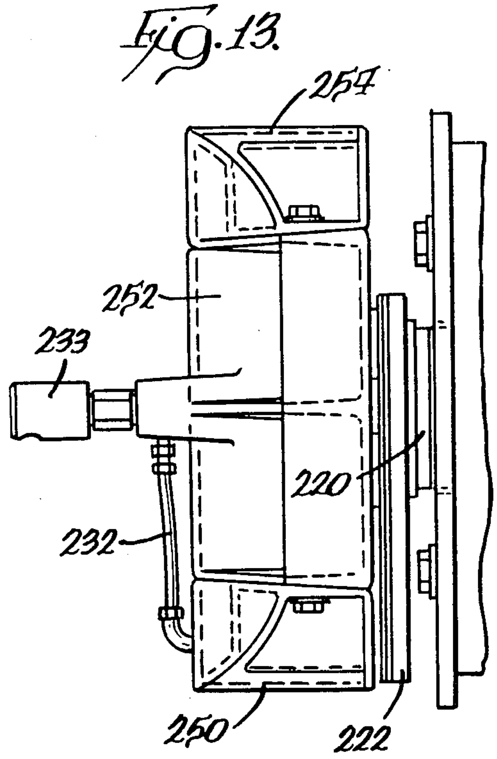
FIG. 13 is an end view of the structure of FIG. 12.

Unbolting bolts 276 and rotating the wheel 221 relative to the fixed weight 222 by 180° and reinserting and rebolting the wheel 221 to the fixed weight 222 will result in the structure of FIGS. 12 and 13 wherein the center of gravity of the movable weight 228 is on the same side of the axis of rotation of the shaft as is the center of gravity of the fixed weight. A structure identical to the structure and operation of FIGS. 5–8 is the result wherein at 0 pounds pressure and rated speed of rotation maximum vibratory forces are generated and at maximum applied pressure in chamber 231 the vibratory forces generated will be 0.

The apparatus of FIGS. 10–13 is capable of operating in either of the two alternative ways by merely reorienting the wheel relative to the fixed weight by 180°.

It is especially advantageous to use a coil spring in the arrangement shown due to the fact that the deflection of a coil spring in either tension or compression is directly proportional to the force, i.e., is in linear relationship. This linear relationship contributes to the ease and accuracy of control of the vibratory force produced by the system.

A further form of the invention is shown in FIGS. 14–20 wherein the vibratory apparatus forming the principal basis of the present continuation-in-part application provides for controlling the lead angle and the extent of the vibratory force in a bowl-type vibratory mill, it being understood that the present invention could have wide uses in many different apparatus using vibratory mechanisms wherein the lead angle and/or the amount of the vibratory force is an important aspect thereof.

FIG. 14 shows a finishing mill 300 resiliently mounted by coil springs 302 on a base 304. The mill includes a support wall 306 upon which is secured a bowl 308 defined by concentric walls 310,312 joined by a semi-circular base 314.

At the midportion of the support wall is rigidly attached a motor 316 having a shaft 318 with a longitudinal axis 319 extending through and perpendicular to the support wall. A vibratory apparatus 320 is affixed on the shaft for rotation therewith. Although the motor is illustrated as having only a single ended shaft, it is to be understood that the motor could have a double ended shaft with a duplicate vibratory apparatus 320 mounted on each end thereof, but for simplicity of description, only one vibratory apparatus is described as affixed to one end of the shaft of the motor.

As is shown in FIGS. 15 and 16, a circular plate 322 is keyed to the shaft 318 of the motor, which plate 322 has a plurality of threaded holes 324 equally spaced apart on a circle which has its center at the center of the plate. A fixed weight 326 of pie-shaped configuration has an aperture 327 at its pointed portion 328 encircling the shaft 318 and in its unattached form is free to rotate relative to the shaft of the motor. The fixed weight 326 has holes 330 through which bolts 332 pass before being threaded into selected threaded holes 324 in the mounting plate. As illustrated, it is contemplated that the fixed weight can be positioned in any one of eight different locations around a circle defined by the mounting plate.

A line drawn through the center of gravity 333 of the fixed weight 326 and the axis of rotation 319 of the shaft 318 is defined as a base line, its significance becoming apparent hereinafter.

A cylindrical housing 334 is secured by bolts 336 and spacers 338 to the mounting plate 322 with the axis 340 of the housing coinciding with the axis 319 of the shaft 318 of the motor 316 so that the housing 334 will rotate about the axis of the shaft. Mounted within the cylindrical housing is an elongate cylinder member 342 which has an elongate longitudinal axis 344 through the center thereof, which axis 344 intersects the axis 340 of the housing and the axis 319 of the shaft at right angles thereto.

Figure 18:
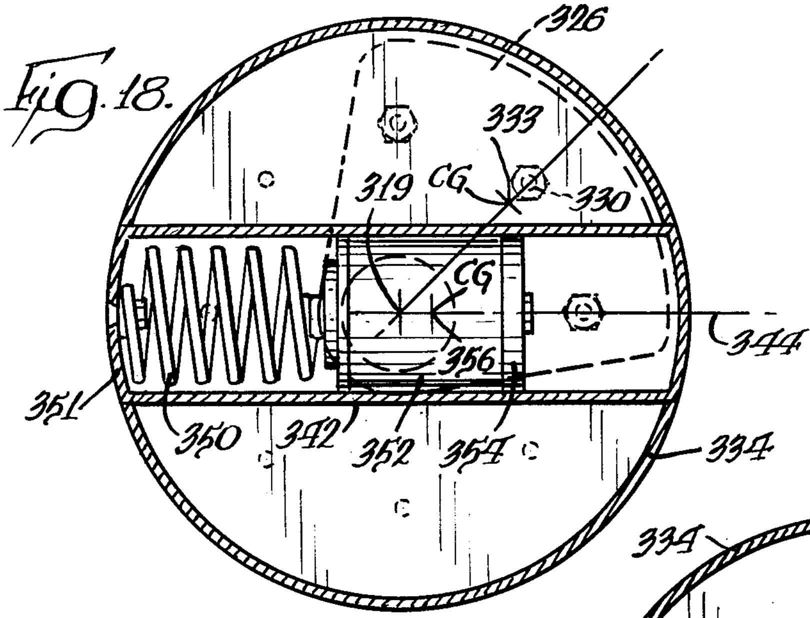
FIG. 18 is a cross-sectional view similar to FIG. 16, only with a different relative position between the fixed weight and the movable weight in the cylinder being shown.
Figure 19:
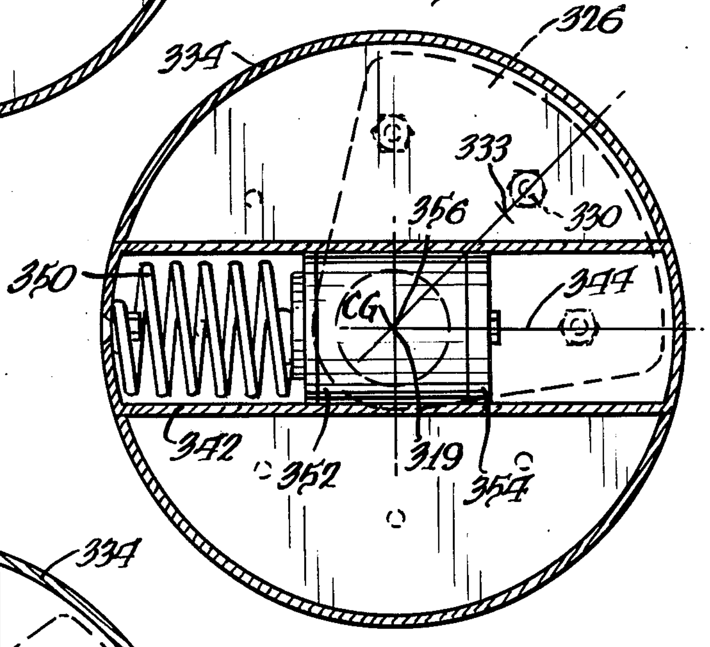
FIG. 19 is a cross-sectional view of the apparatus of FIG. 18 only with the movable weight moved outboard from the position of FIG. 18.
Figure 20:
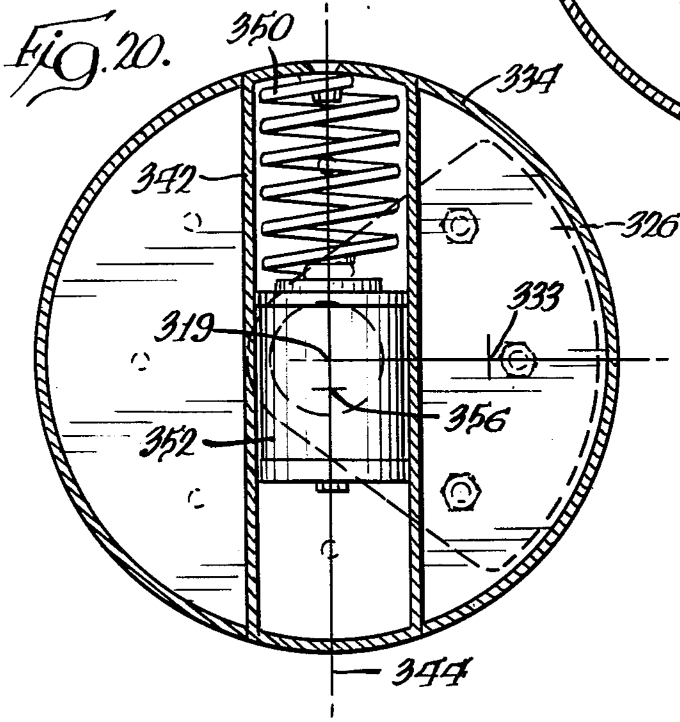
FIG. 20 is another cross-sectional view similar to FIG. 16 only with the fixed weight positioned in a different location relative to the movable weight in the cylinder.

FIGS. 15, 16 and 17 show the fixed weight 326 mounted with its center of gravity along the longitudinal axis of the cylinder. FIGS. 18 and 19 illustrate the fixed weight 326 mounted approximately 45° with respect to the axis of the cylinder. FIG. 20 illustrates the fixed weight 326 mounted on the mounting plate along an axis perpendicular to the longitudinal axis of the cylinder.

The version of the invention shown in FIGS. 15, 16 and 17 is substantially the same as the version shown in FIGS. 6, 7 and 8 with the spring 350 in the cylinder 342 connected between end wall 351 and movable weight 352. The movable weight is slidable in the cylinder 342 and is connected to the piston 354. In the unloaded position of the spring 350 the center of gravity (C.G.) 356 of the movable weight 352 is on the same side of the longitudinal axis 319 of the shaft 318 as is the center of gravity 333 of the fixed weight 326. Line 360, coupling 362 and line 364 supply pressure to the piston 354.

The apparatus shown in FIGS. 15–17 will have a zero (0) lead angle; that is, the base line from the center of gravity 333 of the fixed weight 326 to the axis of rotation 319 coincides with the longitudinal axis of the cylinder 342, thus a zero lead angle. With a 0 lead angle the apparatus will operate the same as FIGS. 6,7,8 providing a vibratory force to the bowl that may be varied from 0 to a maximum depending on the position of the movable weight 352 relative to the fixed weight 326. The bowl will have a vibratory force that will agitate the parts but will not roll or advance the parts around the bowl in any predetermined pattern.

Turning to FIGS. 18 and 19, the fixed weight 326 has been unbolted from the plate 322, rotated 45° and reattached so that the base line defined by the center of gravity 333 of the fixed weight 326 and the axis of rotation 319 forms an angle of 45° with the longitudinal axis 344 of the cylinder 342. Rotation of the apparatus and operating the pressure control to the piston 354 will locate the movable weight relative to the fixed weight 326 such that the resultant of the centrifugal forces of the fixed weight and movable weight will be between the two weights and in an amount dependent on the amounts of the two weights. As an example, if the centrifugal force of the fixed weight 326 equals the centrifugal force of the movable weight and they are operating with the centers of gravity at the same radius from the axis of rotation, the resultant will be along a line bisecting the angle between the two and in an amount based thereon. The angle between the longtiudinal axis of the movable weight and the resultant is the lead angle which determines the amount of rolling, tumbling vibration transmitted to the parts in the bowl to agitate and mill the parts as they advance around the bowl. The lead angle and the amount of the vibratory force can be varied by moving the movable weight relative to the axis of rotation by admitting or removing pressure in the cylinder.

With the movable weight and spring located in the cylinder such that the center of gravity of the movable mass coincides with the axis of rotation the lead angle will be 45° coinciding with the base line between the center of gravity 333 of the fixed weight and the center of rotation.

FIG. 20 illustrates still a different location of the fixed weight 326 on the plate 322 so that the base line from the center of gravity 333 to the axis of rotation 319 forms a 90° angle with the longitudinal axis 344 of the cylinder. The resultant produced by rotation of the apparatus with the movable weight 352 held in a fixed position relative to the fixed weight is arrived at in the same manner discussed above with respect to FIGS. 18,19.

From the above it is recognized that the lead angle and force of a vibratory apparatus as used, for instance, on a milling device may be adjusted within limits without stopping the apparatus. Appropriate mechanisms are provided to add parts to or to remove parts from the bowl, which additions or removal will require adjustment of the apparatus to maintain a constant level of milling.

I claim:

1. Apparatus for varying the lead angle and the amount of a vibratory force generated by a rotating mass comprising a rotatably mounted shaft, means for rotating the shaft, a device mounted on the shaft, a fixed weight, means mounting the fixed weight on the device for rotation with the shaft, an elongate cylinder on the device and having an elongate axis passing through the axis of rotation of the shaft at right angles to said axis of rotation, said fixed weight having a center of gravity radially of the axis of the shaft with a line connecting said axis of the shaft and the center of gravity establishing a base line, said base line and said elongate axis defining an angle therebetween that is greater than 0° and less than 180°, a movable weight mounted for axial movement in the cylinder, a tension and compression spring in the cylinder for urging the movable weight radially outboard of the axis of rotation of the shaft, said spring having its one end attached to the cylinder and its other end attached to the movable weight, said weight being movable upon compression of the spring to one side of the shaft axis and upon tensioning of the spring to the other side of the shaft axis and means operable to move the movable weight inboard toward said shaft or outboard away from said shaft whereby the lead angle of the vibratory force will be along the resultant between the base line and the elongate axis in non-coincidence with the elongate axis of the cylinder and in an amount determined by the relative locations of the fixed weight and the movable weight.

2. Apparatus for milling parts using a vibratory force generated by a rotating mass comprising a rotatably mounted shaft, a mounting plate, means for fixing the mounting plate for rotation with the shaft, a fixed weight, means for mounting the fixed weight in one of a plurality of positions on the plate and having a center of gravity spaced radially with respect to the axis of rotation of the shaft to define a base line passing through the center of gravity and the axis of the shaft, guide means having a longitudinal axis passing through the axis of the shaft, means for mounting the guide means on the plate with the longitudinal axis defining an angle with the base line that is greater than 0° and less than 180°, a weight, a tension and compression spring having its one end attached to the guide means and its other end attached to the movable weight, said weight being movable upon compression of the spring to one side of the shaft axis and upon tensioning of the spring to the other side of the shaft axis and means for moving the weight along the longitudinal axis of the guide means whereby the direction of the vibratory force will be along the resultant between the base line and the longitudinal axis and in non-coincidence with the elongate axis of the guide means and in an amount determined by the relative locations of the fixed weight and the movable weight.

3. Apparatus as claimed in claim 2 wherein a piston in the guide means is secured to the movable weight, said piston being operable in response to pressure to move the movable weight in a direction radially of the axis of the shaft.

4. Apparatus for varying the lead angle and the amount of a vibratory force generated by a rotating mass comprising a rotatably driven shaft, means mounted on the shaft for rotation therewith and having a center coincident with the axis of the shaft, a fixed weight, means mounting the fixed weight on the mounted means in a position radially to one side of the axis of rotation of the shaft, an elongate cylinder on the mounted means having an elongate axis passing through the axis of rotation of the shaft, said fixed weight having a center of gravity radially of the axis of the shaft with a line connecting said axis of the shaft and the center of gravity establishing a base line, said base line and said elongate axis defining an angle therebetween that is greater than 0° and less than 180°, a movable weight mounted for axial movement in the cylinder, a tension and compression located at least partially within the cylinder and having an end attached to the movable weight, said weight being movable upon compression of the spring to one side of the shaft axis and upon tensioning of the spring to the other side of the shaft axis and means for moving the weight axially of the cylinder, whereby the lead angle of the vibratory force will be along the resultant between the base line and the elongate axis in non-coincidence with the elongate axis of the elongate cylinder and in an amount determined by the relative locations of the fixed weight and the movable weight.

5. Apparatus for varying the vibratory force generated by a rotating mass comprising a rotatably mounted shaft, means for rotating the shaft, a mounting plate fixed on the shaft, a fixed weight mounted on the plate and having a center of gravity radially spaced on one side of the axis of rotation of the shaft to define a base line passing through the center of gravity and the axis of the shaft, a cylinder having a longitudinal axis passing through the axis of the shaft, means for mounting the cylinder on the plate so as to define an angle between the base line and the longitudinal axis of the cylinder that is greater than 0° and less than 180°, a movable weight in the cylinder, a coil spring in the cylinder having its one end secured to one end of the cylinder and having its other end secured to the movable weight, said spring being designed and arranged to move the movable weight to a position on the one side of the axis of rotation of the shaft when the shaft is at rest, and said spring tensionally resisting but not preventing movement of the movable weight to the other side of the axis of rotation of the shaft when the shaft is rotated, a piston in the cylinder secured to the movable weight, said piston being operable in response to fluid pressure to move the movable weight in a direction radially of the axis of the shaft, a source of fluid pressure and means connecting said source to one side of said piston to cause movement of the piston and movable weight whereby the direction of the vibratory force will be along the resultant between the base line and the longitudinal axis and non-coincident with the longitudinal axis of the cylinder in an amount determined by the relative locations of the fixed weight and the movable weight.

* * * * *